United States Patent [19]

Nishida et al.

[11] Patent Number: 5,544,981

[45] Date of Patent: Aug. 13, 1996

[54] CAPSULE FOR USE IN FIXING AN ANCHOR BOLT

[75] Inventors: Seiji Nishida; Shoichiro Kai, both of Nobeoka, Japan

[73] Assignee: Asahi Kasei Kogyo Kabushiki Kaisha, Osaka, Japan

[21] Appl. No.: 256,548

[22] PCT Filed: Feb. 28, 1994

[86] PCT No.: PCT/JP94/00323

§ 371 Date: Jul. 20, 1994

§ 102(e) Date: Jul. 20, 1994

[87] PCT Pub. No.: WO94/20731

PCT Pub. Date: Sep. 15, 1994

[30] Foreign Application Priority Data

Mar. 1, 1993 [JP] Japan .................................. 5-039184

[51] Int. Cl.$^6$ ........................................... E21D 20/02
[52] U.S. Cl. ................................................... 405/259.6
[58] Field of Search ............................. 405/259.1, 259.6; 525/922, 531

[56] References Cited

U.S. PATENT DOCUMENTS

| | | | |
|---|---|---|---|
| 3,108,443 | 10/1963 | Schuermann et al. | 405/259.6 |
| 4,103,771 | 8/1978 | Klatt et al. | 405/259.6 X |
| 4,341,301 | 7/1982 | Meyer et al. | 405/259.6 X |
| 4,353,463 | 10/1982 | Seemann | 405/259.6 X |
| 4,402,633 | 9/1983 | Self | 405/259.6 |
| 4,443,567 | 4/1984 | Sternisa et al. | 405/259.6 X |
| 4,475,998 | 10/1984 | Okitsu et al. | 204/159.15 |
| 4,729,696 | 3/1988 | Goto et al. | 405/259.6 |
| 4,906,684 | 3/1990 | Say | 524/548 |
| 4,907,917 | 3/1990 | Liebhard | 405/259.6 |
| 5,069,581 | 12/1991 | Kistner et al. | 405/259.6 |
| 5,080,531 | 1/1992 | Kistner et al. | 405/259.6 |

FOREIGN PATENT DOCUMENTS

| | | | |
|---|---|---|---|
| 55-161197 | 12/1980 | Japan . | |
| 2500674 | 3/1990 | Japan . | |
| 2104900 | 4/1990 | Japan . | |
| 3267499 | 11/1991 | Japan | 405/259.6 |
| 427528 | 1/1992 | Japan . | |
| 9008202 | 9/1989 | WIPO | 405/259.6 |

Primary Examiner—Michael Powell Buiz
Assistant Examiner—Frederick L. Lagman
Attorney, Agent, or Firm—Birch, Stewart, Kolasch & Birch, LLP

[57] ABSTRACT

Disclosed is a capsule for use in fixing an anchor bolt, which comprises (1) a primary casing having a sealed construction or a fluid-tight construction, (2) a curable resin composition, contained in the primary casing, comprising an ester of an epoxy resin with (meth)acrylic acid, and a reactive monomer, wherein each of the ester and the reactive monomer has a specific gravity equal to or greater than the specific gravity of sea water, (3) a curing agent for the curable resin composition, disposed in association with the primary casing and in isolation from the curable resin composition, wherein the curing agent comprises an organic peroxide, and (4) a surfactant contained in at least one of the curable resin composition and the curing agent, or disposed in association with the primary casing and separately from the curable resin composition and the curing agent. By the use of the capsule of the present invention, not only does it become possible to stably fix an anchor bolt to a base located in sea water or water, or to a base located on a shore, with high strength, but also it is unlikely that any portion of the curable resin composition will escape and float to the surface of the sea, thus enabling the anchor bolt-fixing work to be safely done without a danger of polluting the sea.

15 Claims, 4 Drawing Sheets

CAPSULE FOR USE IN FIXING AN ANCHOR BOLT

TECHNICAL FIELD

The present invention relates to a capsule for use in fixing an anchor bolt to a base, such as concrete, a rock bed or the like. More particularly, the present invention is concerned with a capsule for use in fixing an anchor bolt, which comprises (1) a casing having a sealed construction or a fluid-tight construction, (2) a curable resin composition, contained in the casing, comprising an epoxy acrylate resin composed mainly of an ester of an epoxy resin with (meth-)acrylic acid, and a reactive monomer, wherein each of the epoxy acrylate resin and the reactive monomer has a specific gravity equal to or greater than the specific gravity of sea water, (3) a curing agent for the curable resin composition, disposed in association with the casing and in isolation from the curable resin composition, wherein the curing agent comprises an organic peroxide, and (4) a surfactant contained in at least one member selected from the group consisting of the curable resin composition and the curing agent, or disposed in association with the casing and separately from the curable resin composition and the curing agent, wherein the primary casing is breakable by the action of an anchor bolt when the anchor bolt is driven into the capsule.

Generally, in using a capsule comprising a casing, a curable resin composition contained therein, and a curing agent disposed in isolation from the resin composition, a hole is drilled in a base and the capsule is inserted into the hole. Then, an anchor bolt is driven into the hole. The capsule is broken by the driven anchor bolt, thereby allowing the curable resin composition to be reacted with the curing agent, so that a cured resin is formed and the inserted anchor bolt is fixed to the base. By virtue of the specific construction of the capsule of the present invention, wherein a surfactant is used in addition to a combination of a curable resin composition and a curing agent disposed in isolation from the curable resin composition, and wherein each of the main components of the curable resin composition has a specific gravity equal to or greater than the specific gravity of sea water, not only does it become possible to stably fix an anchor bolt to a base located in sea water or water, or to a base located on a shore, with high strength, but also it is unlikely that any portion of the curable resin composition will escape and float to the surface of the sea. Thus, the anchor bolt-fixing work can be safely done without a danger of polluting the sea.

BACKGROUND ART

The term "anchor bolt" as used herein is intended to mean a bolt which is used in fixing a machine or other structures to bases, such as a rock bed, concrete and masonry.

Heretofore, various methods have been known for fixing an anchor bolt to a base. For example, one of the known methods is as described below. A hole is drilled in a base and a capsule comprising a casing, a thermosetting resin contained therein, e.g., an unsaturated polyester resin, and a curing agent for the thermosetting resin disposed in isolation from the thermosetting resin, is inserted into the hole. An anchor bolt is driven into the hole by means of a hammer drill which has been coupled to the rear end of the bolt. The capsule in the hole is broken by the rotary percussion of the anchor bolt during the driving thereof, allowing the thermosetting resin to be reacted with the curing agent, so that a cured resin is formed and the inserted anchor bolt is fixed to the base. (See Examined Japanese Patent Application Publication No. 38-12863.)

However, the above-mentioned method has drawbacks in that when an anchor bolt is fixed to a base located in sea water or water, or to a base located on a shore, a reactive monomer component, e.g., a styrene monomer component, of the curable resin composition escapes and floats to the surface of the sea, thereby polluting the sea. Further, there is also a problem in that the escape of the reactive monomer leaves a portion of the resin remaining intact and uncured. This uncured resin sinks to the bottom of the sea, thereby polluting the sea.

In order to avoid such a pollution of the sea, a capsule for fixing an anchor bolt, in which each of a curable resin and a reactive monomer has a specific gravity of at least 1.05, has been proposed (see Unexamined Japanese Patent Application Laid-Open Specification No. 4-27528).

Further, there has been proposed a cartridge for use in fixing an anchor element, employing a surfactant in order to prevent a separation between an inorganic cement and an organic resin (see Unexamined Japanese Patent Application Laid-Open Specification No. 55-161197).

When the above-mentioned capsule disclosed in Unexamined Japanese Patent Application Laid-Open Specification No. 4-27528 (which contains a curable resin and a reactive monomer, each having a specific gravity of at least 1.05) is used in fixing an anchor bolt to a base located in sea water or water, or to a base located on a shore, the amount of reactive monomer which escapes and floats on the surface of the sea is reduced to some extent in comparison to the use of a capsule containing a curable resin and a reactive monomer each having a specific gravity of from 1.02 (which is equal to the specific gravity of sea water) to less than 1.05. However, the capsule of the above Japanese patent document cannot completely prevent the escape and floating of a component of the curable resin, so that a danger of polluting the sea still remains.

It has been known that an epoxy acrylate resin can be advantageously used for fixing an anchor bolt. An epoxy acrylate resin is superior to an unsaturated polyester resin in properties, such as alkali resistance and fixing strength between an anchor bolt and a base. However, an epoxy acrylate resin has a high hydrophilicity and, therefore, when an epoxy acrylate resin is used in a capsule for use in fixing an anchor bolt, there are disadvantages in that the fixing strength is likely to be greatly lowered, and the amount of reactive monomer which escapes and floats on the surface of the sea is increased.

In these situations, the present inventors have made extensive and intensive studies with a view toward developing a new type of capsule for use in fixing an anchor bolt which is free from the above-mentioned problems accompanying the conventional capsules; even though an epoxy acrylate resin that is capable of achieving a high fixing strength is used. As a result, it has unexpectedly been found that by the use of a capsule for use in fixing an anchor bolt, which comprises (1) a casing having a sealed construction or a fluid-tight construction, (2) a curable resin composition, contained in the casing, comprising an epoxy acrylate resin composed mainly of an ester of an epoxy resin with (meth-)acrylic acid, and a reactive monomer, wherein each of the epoxy acrylate resin and the reactive monomer has a specific gravity equal to or greater than the specific gravity of sea water, (3) a curing agent for the curable resin composition, disposed in association with the casing and in isolation from the curable resin composition, wherein the curing agent comprises an organic peroxide, and (4) a surfactant contained in at least one member selected from the group consisting of the curable resin composition and the curing agent, or disposed in association with the casing and separately from the curable resin composition and the curing agent, wherein the primary casing is breakable by the action of an anchor bolt when the anchor bolt is driven into the capsule, not only does it become possible to stably fix an anchor bolt to a base located in sea water or water, or to a base located on a shore, with high strength, but also it is unlikely that any portion of the curable resin composition will escape and float to the surface of the sea. Thus the present invention enables the anchor bolt-fixing work to be safely done without a danger of polluting the sea. Based on the above novel findings, the present invention has been completed.

Accordingly, it is an object of the present invention to provide a capsule for use in fixing an anchor bolt, by the use of which not only does it become possible to stably fix an anchor bolt to a base located in sea water or water, or to a base located on a shore, with high strength, but also it is unlikely that any portion of the curable resin composition will escape and float to the surface of the sea, thus enabling the anchor bolt-fixing work to be safely done without a danger of polluting the sea.

The foregoing and other objects, features and advantages of the present invention will be apparent from the following detailed description taken in connection with the accompanying drawings.

DISCLOSURE OF THE INVENTION

According to the present invention, there is provided a capsule for use in fixing an anchor bolt, comprising:

(1) a primary casing having a sealed construction, or having at least one opening which is closed by means of closure means to thereby provide a fluid-tight construction;

(2) a curable resin composition contained in the primary casing, the curable resin composition comprising an epoxy acrylate resin composed mainly of an ester of an epoxy resin with at least one organic acid selected from the group consisting of acrylic acid and methacrylic acid, and a reactive monomer, each of the epoxy acrylate resin and the reactive monomer having a specific gravity equal to or greater than the specific gravity of sea water;

(3) a curing agent for the curable resin composition, disposed in association with the primary casing and in isolation from the curable resin composition, the curing agent comprising an organic peroxide; and (4) a surfactant contained in at least one member selected from the group consisting of the curable resin composition and the curing agent, or disposed in association with the primary casing and separately from the curable resin composition and the curing agent, wherein the primary casing is breakable by the action of an anchor bolt when the anchor bolt is driven into the capsule.

In the capsule of the present invention, the curable resin composition, contained in the primary casing, comprises an epoxy acrylate resin composed mainly of an ester of an epoxy resin with at least one organic acid selected from the group consisting of acrylic acid and methacrylic acid, and a reactive monomer. When the epoxy acrylate resin is cured, it exhibits not only a high fixing strength between an anchor bolt and a base, but also a high alkali resistance. As is well known, an epoxy acrylate resin is produced as a mixture of various compounds rather than a single compound. It is difficult to separate and identify individual compounds of the mixture. Therefore, in general, as in the case of various polymers which are usually obtained in the form of mixtures of a plurality of polymers which differ in the degree of polymerization, the epoxy acrylate resin is regarded as a single compound having a structure presumed stoichiometrically from the types and amounts of the raw materials used (see, for example U.S. Pat. No. 4,729,686, Unexamined Japanese Patent Application Laid-Open Specification NOS. 49-110780 and 49-128088, and Examined Japanese Patent Application Publication No. 55-44766). The epoxy acrylate resins employed in the present invention should also be considered to be those as mentioned above.

With respect to the type of the epoxy acrylate resin to be used in the present invention, there is no particular limitation as long as the specific gravity thereof is equal to or greater than the specific gravity of sea water.

In the present invention, the term "specific gravity" is defined as the ratio of the weight of the epoxy acrylate resin or reactive monomer per unit volume as measured at 25° C. to the weight of water per unit volume as measured at 4° C. (the specific gravity is hereinafter frequently referred to as "$d^{25}$").

There are many types of epoxy acrylate resins having a specific gravity which is equal to or greater than the specific gravity of sea water. Of them, bisphenol A type epoxy acrylate resins (molecular weight=796–881; and $d^{25}$=1.15–1.25) are most preferred because a capsule in which a bisphenol A type epoxy acrylate resin is used exhibits especially high fixing strength. The epoxy acrylate resin can be used in the form of a mixture with an unsaturated polyester resin. If desired, a polymerization cocatalyst which is for accelerating the curing of the epoxy acrylate resin can be added to the epoxy acrylate resin. Examples of polymerization cocatalysts include amines, such as N,N-dimethylaniline, N,N-diethylaniline and N,N-dimethyl-p-toluidine. Further, for improving the stability of the epoxy acrylate resin, a polymerization inhibitor can be added to the resin. As examples of polymerization inhibitors, there can be mentioned hydroquinone, benzoquinone, naphthoquinone, p-methoxyphenol and 2,6-di-t-butyl-p-cresol. The above-mentioned various additives can be used in such amounts as are conventionally employed in the art.

Further, for preventing the epoxy acrylate resin from gelation under sunlight, the resin may optionally contain a coloring agent, a pigment, an ultraviolet ray absorber or the like. In addition, when an ester of an acrylic acid or a methacrylic acid with a di-, tri- or tetrahydric alcohol, as mentioned below, is used as a reactive monomer (which is one of the essential components of the curable resin composition to be used in the present invention), it is preferred that a pigment, such as a lake pigment, an azo pigment, a phthalocyanine pigment, a higher organic pigment or an inorganic pigment be added to the curable resin composition, individually or in combination, since such a reactive monomer is photosensitive. Examples of such pigments include TONER YELLOW, TONER BROWN, TONER GREEN (manufactured and sold by Takeda Chemical Industries, Ltd., Japan), COLORTEX BROWN, COLORTEX ORANGE, COLORTEX MARRON (manufactured and sold by Sanyo Shikiso Kabushiki Kaisha, Japan) and OPLAS YELLOW (manufactured and sold by Orient Chemical Co., Ltd., Japan). These pigments can be used in such amounts as are conventionally employed in the art.

With respect to the reactive monomer, which is one of the essential components of the curable resin composition to be used in the present invention, there is no particular limitation as long as it is susceptible to a radical reaction with the epoxy acrylate resin and it has a specific gravity equal to or greater than the specific gravity of sea water ($d^{25}=1.02$). Examples of reactive monomers include an acrylic acid ester, a methacrylic acid ester, a substituted styrene, a vinyl, a vinyl ester and a vinyl ketone. Of them, an acrylic acid ester and a methacrylic acid ester are preferred. Particularly preferred is an ester of acrylic acid or methacrylic acid with a di-, tri- or tetrahydric alcohol, because such an ester has good copolymerizability with the epoxy acrylate resin. Further, a methacrylic acid ester is more preferred because it exhibits high alkali resistance in concrete. Of reactive monomers, those which have a specific gravity ($d^{25}$) of 1.04 or more are preferred.

Examples of preferred reactive monomers include ethylene glycol dimethacrylate ($d^{25}=1.048$), diethylene glycol dimethacrylate ($d^{25}=1.064$), trimethylolpropane trimethacrylate ($d^{25}=1.067$), pentyltriol tetraacrylate ($d^{40}=1.170$), 2,5-dimethylstyrene ($d^{25}=1.538$), dimethylmaleic acid ($d^{15}1.156, d^{20}=1.150, d^{30}=1.140$). There is no particular limitation with respect to the amount of the reactive monomer to be used, but it is preferred that the reactive monomer be used in an amount of 10 to 60% by weight, based on the total weight of the curable resin composition. It is also preferred that the reactive monomer be used in an amount such that the viscosity of the curable resin composition is 5 to 60 poises (as measured by E type viscometer at 25° C.).

Preferred examples of esters of acrylic acid or methacrylic acid with alcohols other than a di-, tri- or tetrahydric alcohol, include p-methoxybenzyl acrylate ($d^{20}=1.106$) and furfuryl acrylate ($d^{20}=1.112$).

The specific gravity values mentioned above with respect to the reactive monomers include values measured at 20° C. ($d^{20}$) or 40° C. ($d^{40}$). However, even though a small difference exists from the measurement temperature of 25° C., the reactive monomers having the above specific gravity values as measured at 20° C. or 40° C. should also exhibit $d^{25}$ values which are equal to or greater than the specific gravity of sea water ($d^{25}=1.02$).

In the present invention, reactive monomers having specific gravities smaller than the specific gravity of sea water ($d^{25}=1.02$), such as styrene ($d^{25}=0.904$) and methyl methacrylate ($d^{20}=0.936$), cannot be used as the reactive monomer.

In the present invention, any of an anionic surfactant, a cationic surfactant, a nonionic surfactant and an ampholytic surfactant can be used. Of them, an anionic surfactant is most preferred from the viewpoint of achieving an improved fixing strength between an anchor bolt and a base. Preferred examples of anionic surfactants include carboxylic acid salts and sulfonic acid salts. Examples of carboxylic acid salts include alkali metal salts, such as salts of alkyl ether carboxylic acids (e.g., VIEW LIGHT EAC manufactured and sold by Sanyo Chemical Industries, Ltd., Japan). Examples of sulfonic acid salts include salts of sulfosuccinates, such as a dialkyl sulfosuccinate (e.g., SAN-SEPARA 100 manufactured and sold by Sanyo Chemical Industries, Ltd., Japan) and an alkylaryl sulfosuccinate; an alkyl sulfoacetate; an α-olefin sulfonate; salts of sulfuric esters, such as an alkylaryl sulfate and an alkyl ether sulfate; and salts of phosphoric esters, such as an alkyl ether phosphate.

Particularly preferred as the surfactant is a salt of a sulfosuccinate, especially a dialkyl sulfosuccinate or an alkylaryl sulfosuccinate, since a salt of a sulfosuccinate is effective in preventing the epoxy acrylate resin from gelation. With respect to these alkyl moiety-containing sulfosuccinates, it is preferred that the alkyl moiety thereof have 4 to 13 carbon atoms. Preferred examples of alkyl moieties include an octyl group, a hexyl group, a cyclohexyl group, a dodecyl group, an isobutyl group and a tridecyl group. It is more preferred that the above-mentioned anionic surfactant be an alkali metal salt or an ammonium salt. It is still more preferred that the above-mentioned anionic surfactant be a sodium salt. Sodium dioctylsulfosuccinate is most preferred as the anionic surfactant.

In the present invention, the surfactant is contained in at least one member selected from the group consisting of the curable resin composition and the curing agent, or is disposed in association with the primary casing and separately from the curable resin composition and the curing agent. Preferably, the surfactant can be present in the capsule in the form of a mixture thereof with the epoxy acrylate resin. The amount of the surfactant to be used is not particularly limited. However, for achieving an improved fixing strength between an anchor bolt and a base, it is preferred that the surfactant be used in an amount of from 0.001 to 30% by weight, based on the total weight of the curable resin composition and the surfactant. Alternatively, the surfactant can be present in a dissolved form in a reactive monomer. When the surfactant is solid and is not readily soluble in a reactive monomer, an appropriate solvent may be used for dissolving the surfactant, so that the working characteristics and the dispersibility of the surfactant in the reactive monomer can be improved. In a further alternative form of the capsule of the present invention, the surfactant can be disposed in a primary casing or an inner casing which can be contained in the primary casing, separately from the curable resin composition and the curing agent (for example, in a breakable minicapsule). Further, in still a further alternative form of the capsule of the present invention, the surfactant can be disposed on an outer peripheral wall of the primary casing.

The mechanism of the function of the surfactant in the present invention has not yet been elucidated. However, by the use of the capsule of the present invention, wherein a surfactant is used in addition to the combination of a specific curable resin composition and a curing agent, not only can the fixing strength between an anchor bolt and a base in sea water or water be prevented from diminishing, but also an escape of the reactive monomer from the curable resin composition and its floating to the surface of the sea can be prevented. These effects are quite unexpected.

In the present invention, the curing agent is disposed in association with the primary casing and in isolation from the curable resin composition which comprises an epoxy acrylate resin and a reactive monomer. The curing agent usable in the present invention comprises an organic peroxide. Examples of organic peroxides include benzoyl peroxide and methyl ethyl ketone peroxide. If desired, the curing agent can be diluted with an inorganic compound, such as calcium sulfate or calcium carbonate, or with an organic compound, such as dibutyl phthalate or dioctyl phthalate. The morphology of the curing agent is not particularly limited, and the curing agent can have any form, for example, a powdery form, a particulate or granular form, a slurry form, a molded form, a membranous form, or the like.

The amount of the curing agent to be used varies depending on, for example, the type of the capsule of the present invention for use in fixing an anchor bolt as well as the application field in which the capsule is practically used.

However, the amount of the curing agent is generally 1 to 10% by weight, based on the weight of the curable resin composition.

If desired, the capsule of the present invention may further contain an aggregate and a filler. Examples of aggregates include debris of natural stone, such as silica stone, and artificial stone, such as magnesia clinker. Examples of fillers include a powder of an inorganic compound, such as calcium carbonate or calcium sulfate, and an inorganic fiber, such as a glass fiber. The above-mentioned aggregate and the filler may or may not be used according to the application field of the capsule.

The particle sizes of the aggregate and the filler generally vary depending on the size of the casing into which they are charged, but are generally 0.5 to 2.5 mm for the aggregate and 100 to 200 mesh (Tyler) for the filler.

With respect to the material for the primary casing containing the curable resin composition, there is no particular limitation as long as the primary casing does not break during the transportation or storage of the capsule but can be easily broken by the action of an anchor bolt when the anchor bolt is driven into the capsule. Examples of materials for the primary casing include a glass, a ceramic and a synthetic resin. Of these materials, a brown glass is most preferred. On the other hand, the curing agent, which is disposed in isolation from the curable resin composition, may preferably be disposed in an inner casing which is contained in the primary casing in accordance with a preferred embodiment of the present invention and is made of substantially the same material as that of the primary casing. However, as is seen from various embodiments described below, the manner in which the curing agent is disposed in association with the primary casing is not limited to the above-mentioned preferred example, and any manner of disposing the curing agent can be employed as long as the curing agent is disposed in isolation from the curable resin composition.

It is required that the primary casing of the capsule of the present invention and the inner casing which may optionally be used in the present invention have a sealed construction or a fluid-tight construction. The method for realizing such a sealed or fluid-tight construction in the primary casing and the inner casing is appropriately chosen according to the material of the respective casing. For example, when the material of the casing is a glass, a sealed construction or a fluid-tight construction of the casing is generally realized by melt-sealing, by sealing with a silicone resin, or by closing an opening of the casing with a cap or plug which is made of a synthetic resin, such as polyethylene, polypropylene or polyamide. When the material of the casing is a synthetic resin, a fluid-tight construction can be realized by sealing with a silicone resin, or by closing an open end or open ends of the casing with a cap or plug of the type as mentioned above. When the material of the casing is a synthetic resin film, a fluid-tight construction can be realized by throttling with clips, such as wires so as to close the open ends of the casing.

As mentioned above, the capsule of the present invention comprises: (1) a primary casing having a sealed construction, or having at least one opening which is closed by means of closure means to thereby provide a fluid-tight construction; (2) a curable resin composition contained in the primary casing, the curable resin composition comprising an ester of an epoxy resin with (meth)acrylic acid, and a reactive monomer, each of the ester and the reactive monomer having a specific gravity equal to or greater than the specific gravity of sea water; (3) a curing agent for the curable resin composition, disposed in association with the primary casing and in isolation from the curable resin composition, the curing agent comprising an organic peroxide; and (4) a surfactant contained in at least one member selected from the group consisting of the curable resin composition and the curing agent, or disposed in association with the primary casing and separately from the curable resin composition, wherein the primary casing is breakable by the action of an anchor bolt when the anchor bolt is driven into the capsule. With respect to the morphology of the capsule of the present invention, including the structure of the primary casing, and the illustrative manner for disposing the curing agent (which comprises an organic peroxide) for the curable resin composition in association with the primary casing and in isolation from the curable resin composition, various morphologies can be mentioned. Illustrative examples of the morphologies include:

(a) an interior of the primary casing is fluid-tightly divided into a first chamber and a second chamber by means of partition means, one of the first and second chambers containing the curing agent and the other chamber containing the curable resin composition, wherein the partition means is brekable when the anchor bolt is driven into the capsule;

(b) a modification of the morphology of item (a) above, wherein the partition means is constituted by an entire wall of a fluid-tightly constructed inner casing disposed in the primary casing, so that the first chamber is defined by a space between the inner peripheral wall of the primary casing and the outer peripheral wall of the inner casing and the second chamber is defined by an inner space of the inner casing;

(c) the curing-agent is disposed on at least a portion of an outer peripheral wall of the primary casing;

(d) the primary casing has at least one opening which is closed by means of closure means, wherein the closure means is a clip, a cap fluid-tightly fitted over an outer peripheral wall of the opening, or a plug having an end portion thereof fluid-tightly inserted in the opening; and (e) the primary casing has at least one opening which is closed by means of closure means, wherein the closure means is a plug made of the curing agent in solidified form and having an end portion thereof fluid-tightly inserted in the opening, and wherein the inserted end portion of the plug is in contact with and cooperates with a portion of the curable resin composition contained in the primary casing, which portion faces the inserted end portion of the plug, to form a partition membrane by a reaction therebetween, the partition membrane isolating the curing agent from the curable resin composition.

However, the morphology of the capsule of the present invention is not limited to the examples of items (a) to (e) above, and can assume various other modified forms without departing from the scope of the present invention.

Referring now to FIGS. 1 to 7, preferred embodiments of the present invention are described below.

In FIGS. 1 to 7, like parts and portions are designated by like numerals.

FIG. 1 shows a diagrammatic cross-sectional view of one form [corresponding to the morphologies of items (a) and (b) above] of the capsule of the present invention, showing the interior thereof. Glass inner casing 5 having a melt-sealed construction is disposed in glass primary casing 4 having a melt-sealed construction. Inner casing 5 contains curing agent 2, and primary casing 4 contains curable resin composition 1 and aggregate 3. This embodiment of the present invention may be modified so as to dispose curable resin composition 1 in inner casing 5 and dispose curing agent 2 in primary casing 4. The surfactant is contained in at least one of primary casing 4 and inner casing 5.

FIG. 2 shows a diagrammatic cross-sectional view of another form [corresponding to the morphologies of items (a), (b) and (d) above] of the capsule of the present invention, showing the interior thereof. Glass primary casing 4 has an opening, and cap 6 as the closure means closing the opening is fluid-tightly fitted over an outer peripheral wall of the opening. Glass inner casing 5 having a melt-sealed construction is disposed in the above-mentioned primary casing 4. Inner casing 5 contains curing agent 2, and primary casing 4 contains curable resin composition 1 and aggregate 3. This embodiment of the present invention may be modified so as to dispose curable resin composition 1 in inner casing 5 and dispose curing agent 2 in primary casing 4. The surfactant is contained in at least one of primary casing 4 and inner casing 5.

FIG. 3 shows a diagrammatic cross-sectional view of still another form [corresponding to the morphologies of items (a) and (b) above] of the capsule of the present invention, showing the interior thereof. Glass inner casing 5 having a melt-sealed construction is disposed in glass primary casing 4 having a melt-sealed construction. Inner casing 5 contains aggregate 3 having curing agent 2 adhered to the surface thereof, and primary casing 4 contains curable resin composition 1. Curing agent 2 adhered to the surface of aggregate 3 contained in inner casing 5 is in a dried state. When the capsule is broken by the action of an anchor bolt, curing agent 2 is released from the surface of aggregate 3 and is mixed with curable resin composition 1. This embodiment of the present invention may be modified so as to dispose curable resin composition 1 in inner casing 5 and dispose aggregate 3 having curing agent 2 adhered to the surface thereof in primary casing 4. The surfactant is contained in at least one of primary casing 4 and inner casing 5.

FIGS. 4(a) and 4(b) show diagrammatic cross-sectional views of a further form [corresponding to the morphologies of items (a) and (d) above] of the capsule of the present invention. An interior of primary casing 4 made of a resin film is fluid-tightly divided into a first chamber and a second chamber by means of partition membrane 5' which is integrally formed with primary casing 4 and extends in the longitudinal direction of primary casing 4. The first chamber contains curing agent 2 and the second chamber contains curable resin composition 1 and aggregate 3. Both ends of primary casing 4 made of a resin film are closed by clips 7, 7, and primary casing 4 is accommodated in glass outer casing 4'. Glass outer casing 4' prevents primary casing 4 made of a resin film from being damaged during transportation or storage thereof. When glass outer casing 4' is broken by the action of an anchor bolt, thus forming broken glass pieces, primary casing 4 made of a resin film is also broken into small pieces by the broken glass pieces. The surfactant is contained in at least one of curable resin composition 1 and curing agent 2.

FIG. 5 shows a diagrammatic side view of still a further form [corresponding to the morphology of item (b) above] of the capsule of the present invention, partly shown in cross-section. Glass inner casing 5 having a melt-sealed construction is disposed in primary casing 4 made of a resin film and having a fluid-tight construction. Primary casing 4 has openings at both ends thereof and the openings are closed by means of clips 7,7. Inner casing 5 contains curing agent 2, and primary casing 4 contains curable resin composition 1. Curable resin composition 1 contains calcium carbonate as a filler which serves to increase the viscosity of curable resin composition 1, so that inner casing 5 is stably held in primary casing 4 due to the increased viscosity of curable resin composition 1. The surfactant is contained in at least one of curable resin composition 1 and curing agent 2.

FIG. 6 shows a diagrammatic cross-Sectional view of still a further form [corresponding to the morphology of item (c) above] of the capsule of the present invention. Glass primary casing 4 having a melt-sealed construction contains curable resin composition 1 and has a plurality of annular recesses on an outer peripheral wall thereof. Curing agent 2 is disposed in the annular recesses of the outer peripheral wall of primary casing 4. Curing agent 2 is disposed in a dried state. When the capsule is broken by the action of an anchor bolt, curing agent 2 is released from the annular recesses of the outer peripheral wall of primary casing 4 and is mixed with curable resin composition 1. The surfactant is contained in primary casing 4.

FIG. 7 shows a diagrammatic side view of still a further form [corresponding to the morphologies of items (c) and (e) above] of the capsule of the present invention, partly shown in cross-section. Glass primary casing 4 having a plurality of annular recesses on an outer peripheral wall thereof has an opening which is closed by means of closure means. The closure means is plug 2' made of a curing agent in solidified form and having an end portion thereof fluid-tightly inserted in the opening of primary casing 4. Further, curing agent 2 is also disposed over the outer peripheral wall of primary casing 4. The inserted end portion of plug 2' is in contact with and cooperates with a portion of curable resin composition 1 contained in primary casing 4, which portion faces the inserted end portion of plug 2', to form a partition membrane by a reaction therebetween. The partition membrane isolates plug 2' made of a curing agent from curable resin composition 1, and the entire wall of primary casing 4 isolates curing agent 2 from curable resin composition 1. Curing agent 2 disposed over the outer peripheral wall of primary casing 4 is in a dried, solidified form. When the capsule is broken by the action of an anchor bolt, curing agent 2 is released from the outer peripheral wall of primary casing 4, so that both of curing agent 2 and broken pieces of plug 2' made of a curing agent are mixed with curable resin composition 1. The surfactant is contained in primary casing 4.

Referring now to FIG. 8, a method for fixing an anchor bolt to a base, using the capsule of the present invention, for example, the capsule shown in FIG. 1, will be described below. In FIG. 8, the same parts and portions as in FIGS. 1 to 7 are indicated by the same numerals as in those figures.

As shown in FIG. 8, capsule 13 is inserted into hole 11 drilled in base 10. Anchor bolt 8 is driven into hole 11 by means of a hammer drill or the like which has been securely coupled to the rear end of anchor bolt 8 and which gives rotary percussion to anchor bolt 8. Anchor bolt 8 has its tip end 9 which has been cut diagonally relative to the axis of anchor bolt 8. During the driving of anchor bolt 8 into hole 11, anchor bolt 8 breaks capsule 13. Due to the breakage of primary casing 4 and inner casing 5 of capsule 13, curable resin composition 1, curing agent 2 and aggregate 3 are mixed with each other to thereby form mixture 12 which includes broken pieces of primary casing 4 and inner casing 5. The space between the inner wall of hole 11 and anchor bolt 8 is filled with mixture 12. By the curing of mixture 12, anchor bolt 8 is fixed to base 10.

With respect to general descriptions of a capsule for use in fixing an anchor bolt, reference can be made to U.S. Pat. No. 4,729,696.

BEST MODE FOR CARRYING OUT THE INVENTION

The present invention will be described in greater detail with reference to the following Examples, which should not be construed as limiting the scope of the present invention.

EXAMPLE 1

A capsule for use in fixing an anchor bolt was prepared by the following method. 65% by weight of an epoxy acrylate resin (Ripoxy VR-77 manufactured and sold by Showa Highpolymer Co. Ltd., Japan), 33% by weight of ethyleneglycol dimethacrylate ($d^{25}=1.048$) as a reactive monomer, 1% by weight of N,N-dimethylaniline as a polymerization cocatalyst and 1% by weight of sodium dioctyl sulfosuccinate as an anionic surfactant were mixed to thereby obtain a mixture. 21 g of the obtained mixture was charged into a glass primary casing having an outer diameter of 20 mm, a wall thickness of 1.0 mm and a length of 190 mm. Separately, 4.3 g of benzoyl peroxide which had been diluted to a 40% concentration with calcium carbonate was charged into a glass inner casing having an outer diameter of 7.0 mm, a wall thickness of 0.6 mm and a length of 140 mm, and the inner casing was then melt-sealed. The sealed inner casing was inserted into the above-mentioned primary casing, and 34 g of silica stones as an aggregate was charged into the primary casing. Then, the primary casing was melt-sealed, thereby obtaining a capsule. This capsule had the same morphology as that of the capsule shown in FIG. 1.

Subsequently, using the above-prepared capsule, an anchor bolt-fixation test was conducted by the following method in order to examine whether or not any floating matters were observed. A concrete block having a size of 500 mm×500 mm×100 mm and having a compression strength of 210 kg/cm$^2$ was subjected to boring to obtain a hole having a diameter of 24 mm and a depth of 200 mm, and the hole was cleaned. Subsequently, the concrete block was placed in a container having a size of 750 mm×750 mm×1500 mm and the container having the concrete block placed therein was filled with sea water. The above-mentioned capsule was inserted into the hole of the concrete block. A wholly threaded anchor bolt (made of SNB7) having a diameter of 20 mm and having its tip end cut at 45° was securely coupled at its rear end to an electric hammer drill, and the anchor bolt was driven to the bottom of the hole by rotary percussion of the hammer drill, as shown in FIG. 8. Subsequently, the surface of the sea water was observed.

Further, the fixing strength between the wholly threaded anchor bolt driven into the hole and the concrete block was measured. The measurement was conducted 24 hours after the anchor bolt was driven to the bottom of the hole, by means of ANSER-5-III (manufactured and sold by Asahi Kasei Kogyo Kabushiki Kaisha, Japan) which is a tensile testing machine for an anchor bolt.

The anchor bolt-fixation tests as described above, including measurement of the fixing strength, was repeated 3 times. The results are shown in Table 1.

EXAMPLE 2

Preparation of a capsule was conducted in the same manner as in Example 1 except that diethylene glycol dimethacrylate ($d^{25}=1.064$) was used as the reactive monomer and sodium octylaryl sulfosuccinate as the anionic surfactant. Then, fixation tests, including observations of the surface of the sea water and measurement of the fixing strength, were conducted in the same manner as in Example 1. The results are shown in Table 1.

Comparative Example 1

Preparation of a capsule was conducted in the same manner as in Example 1 except that a surfactant was not used. Then, fixation tests, including observations of the surface of the sea water and measurement of the fixing strength, were conducted in the same manner as in Example 1. The results are shown in Table 1.

Comparative Example 2

Preparation of a capsule was conducted in the same manner as in Example 2 except that a surfactant was not used. Then, fixation tests, including observations of the surface of the sea water and measurement of the fixing strength, were conducted in the same manner as in Example 2. The results are shown in Table 1.

EXAMPLE 3

Preparation of a capsule was conducted in the same manner as in Example 1 except that polyoxyethylene nonylphenyl ether, which is a nonionic surfactant, was used as the surfactant. Then, fixation tests, including observations of the surface of the sea water and measurement of the fixing strength, were conducted in the same manner as in Example 1. The results are shown in Table 1.

EXAMPLE 4

Preparation of a capsule was conducted in the same manner as in Example 1 except that lauryl trimethylammonium chloride, which is a cationic surfactant, was used as the surfactant. Then, fixation tests, including observations of the surface of the sea water and measurement of the fixing strength, were conducted in the same manner as in Example 1. The results are shown in Table 1.

EXAMPLE 5

Preparation of a capsule was conducted in the same manner as in Example 1 except that lauryl dimethyl betaine, which is an ampholytic surfactant, was used as the surfactant. Then, fixation tests, including observations of the surface of the Sea water and measurement of the fixing strength, were conducted in the same manner as in Example 1. The results are shown in Table 1.

COMPARATIVE EXAMPLE 3

Preparation of a capsule was conducted in the same manner as in Example 1 except that styrene monomer ($d^{25}=0.90$) was used as the reactive monomer. Then, fixation tests, including observations of the surface of the sea water and measurement of the fixing strength, were conducted in the same manner as in Example 1. The results are shown in Table 1.

TABLE 1

|  | Observations of the surface of the sea water | Anchor bolt-fixation test No. | Fixing strength |
| --- | --- | --- | --- |
| Example 1 | No floating matters were observed in the surface of the sea water. | 1<br>2<br>3 | 20 tons or more<br>20 tons or more<br>20 tons or more |
| Example 2 | No floating matters were observed in the surface of the sea water. | 1<br>2<br>3 | 20 tons or more<br>20 tons or more<br>20 tons or more |
| Comparative Example 1 | A large amount of floating matters were observed in the surface of the sea water, but they sank upon being stimulated. | 1<br>2<br>3 | 12 tons<br>11 tons<br>12 tons |
| Comparative Example 2 | Some amount of floating matters were observed in the surface of the sea water, but they sank upon being stimulated. | 1<br>2<br>3 | 12 tons<br>12 tons<br>11 tons |
| Example 3 | Almost no floating matters were observed in the surface of the sea water. | 1<br>2<br>3 | 16 tons<br>16 tons<br>17 tons |
| Example 4 | Almost no floating matters were observed in the surface of the sea water. | 1<br>2<br>3 | 16 tons<br>15 tons<br>17 tons |
| Example 5 | Almost no floating matters were observed in the surface of the sea water. | 1<br>2<br>3 | 16 tons<br>16 tons<br>16 tons |
| Comparative Example 3 | A large amount of floating matters were observed in the surface of the sea water, and they formed a film, which did not sink upon being stimulated. | 1<br>2<br>3 | 20 tons or more<br>20 tons or more<br>20 tons or more |

INDUSTRIAL APPLICABILITY

Figure 1:
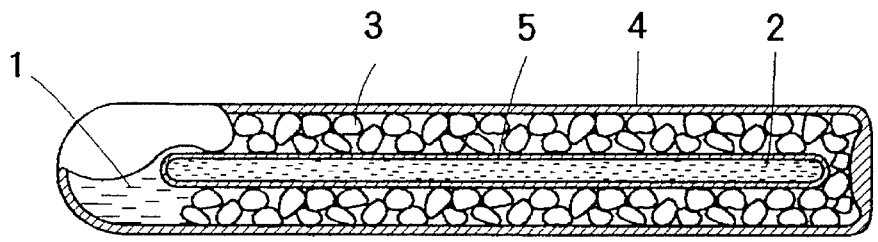
FIG. 1 shows a diagrammatic cross-sectional view of one form of the capsule of the present invention, showing the interior thereof, wherein glass inner casing 5 having a melt-sealed construction is disposed in glass primary casing 4 having a melt-sealed construction, and wherein inner casing 5 contains curing agent 2, and primary casing 4 contains curable resin composition 1 and aggregate 3.
Figure 2:
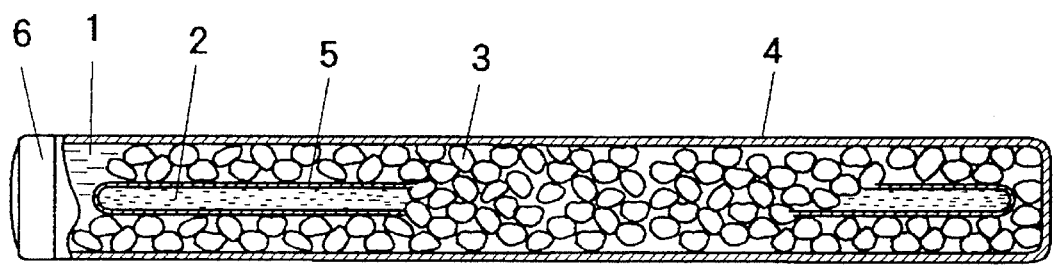
FIG. 2 shows a diagrammatic cross-sectional view of another form of the capsule of the present invention, showing the interior thereof, wherein glass primary casing 4 has an opening, and cap 6 as the closure means closing the opening is fluid-tightly fitted over an outer peripheral wall of the opening, wherein glass inner casing 5 having a melt-sealed construction is disposed in the above-mentioned primary casing 4, and wherein inner casing 5 contains curing agent 2, and primary casing 4 contains curable resin composition 1 and aggregate 3.
Figure 3:
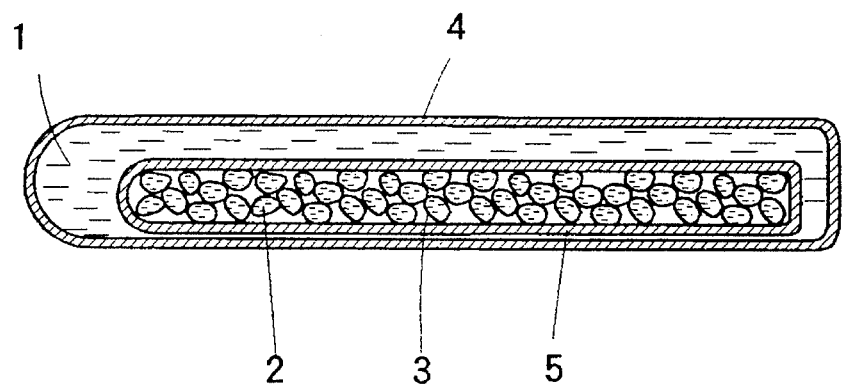
FIG. 3 shows a diagrammatic cross-sectional view of still another form of the capsule of the present invention, showing the interior thereof, wherein glass inner casing 5 having a melt-sealed construction is disposed in glass primary casing 4 having a melt-sealed construction, and wherein inner casing 5 contains aggregate 3 having curing agent 2 adhered to the surface thereof, and primary casing 4 contains curable resin composition 1.
Figure 4:
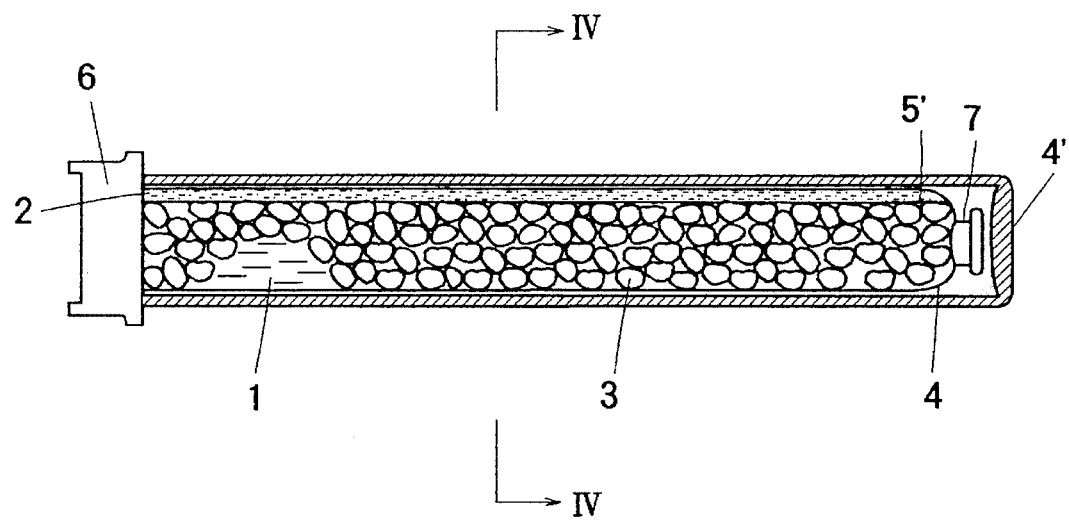
FIG. 4(a) shows a diagrammatic cross-sectional view of a further form of the capsule of the present invention, showing the interior thereof, wherein an interior of primary casing 4 made of a resin film is fluid-tightly divided into a first chamber and a second chamber by means of partition membrane 5', wherein the first chamber contains curing agent 2 and the second chamber contains curable resin composition 1 and aggregate 3, and wherein primary casing 4 is accommodated in glass outer casing 4'.
FIG. 4(b) shows a cross-sectional view, taken along line IV—IV of FIG. 4(a).
Figure 4:
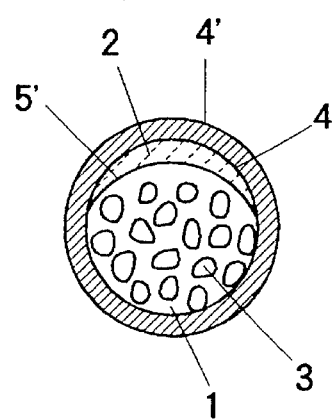
Figure 5:
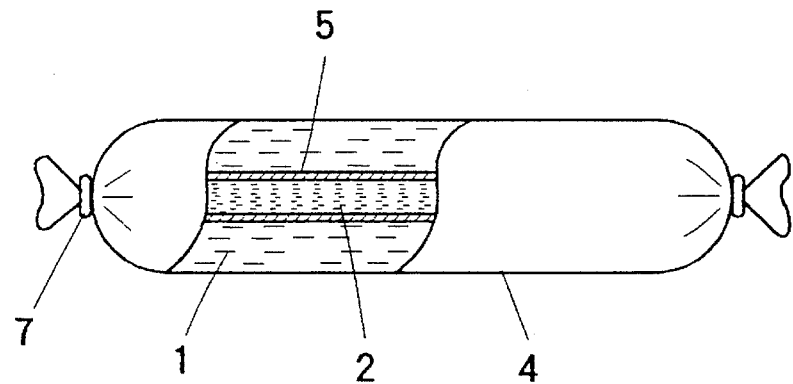
FIG. 5 shows a diagrammatic side view of still a further form of the capsule of the present invention, partly shown in cross-section, wherein glass inner casing 5 having a melt-sealed construction is disposed in primary casing 4 made of a resin film and having a fluid-tight construction, and wherein inner casing 5 contains curing agent 2, and primary casing 4 contains curable resin composition 1.
Figure 6:
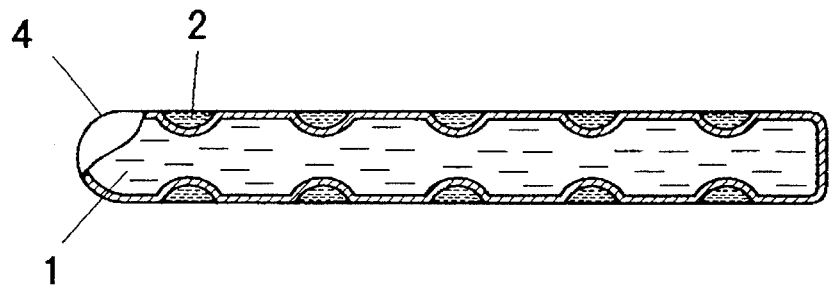
FIG. 6 shows a diagrammatic cross-sectional view of still a further form of the capsule of the present invention, wherein glass primary casing 4 having a melt-sealed construction contains curable resin composition 1 and has a plurality of annular recesses on an outer peripheral wall thereof, and wherein curing agent 2 is disposed in the annular recesses of the outer peripheral wall of primary casing 4.
Figure 7:
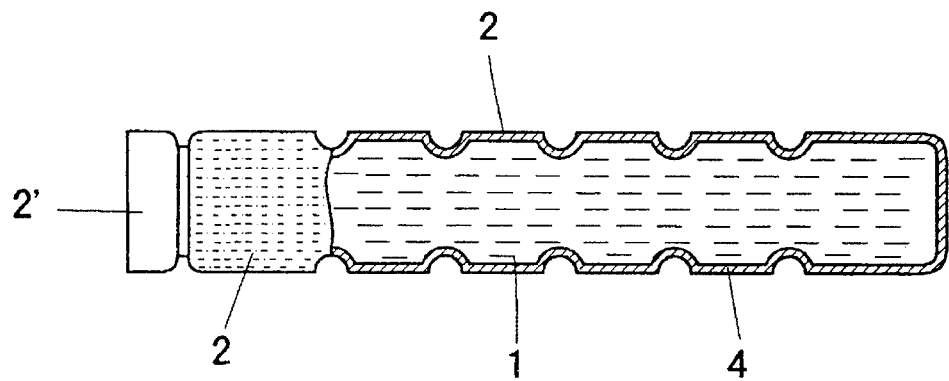
FIG. 7 shows a diagrammatic side view of still a further form of the capsule of the present invention, partly shown in cross-section, wherein glass primary casing 4 having a plurality of annular recesses on an outer peripheral wall thereof has an opening which is closed by means of closure means, wherein the closure means is plug 2' made of a curing agent in solidified form and having an end portion thereof fluid-tightly inserted in the opening of primary casing 4, and wherein curing agent 2 is also disposed over the outer peripheral wall of primary casing 4.
Figure 8:
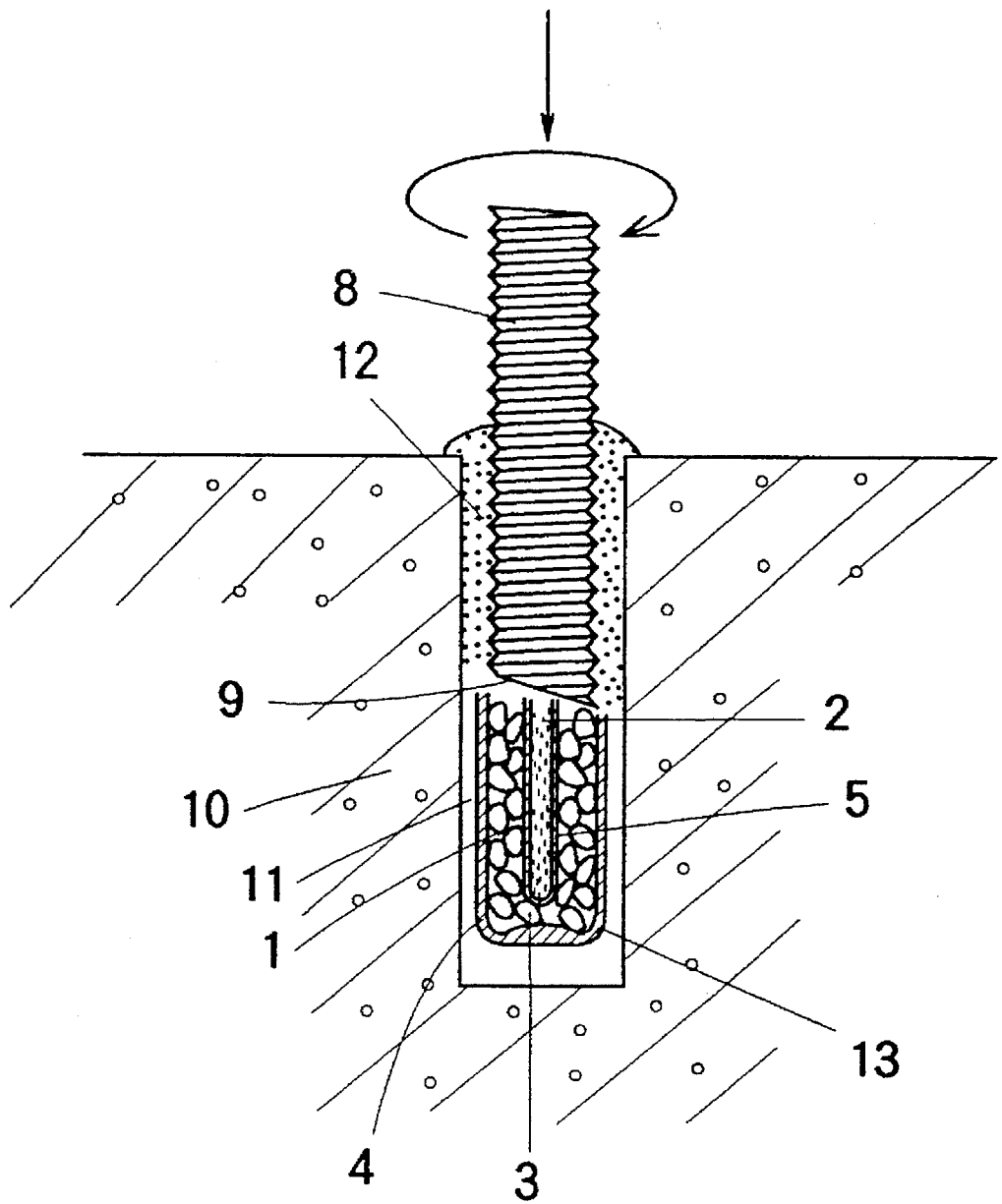
FIG. 8 shows a diagrammatic side view illustrating a method for fixing anchor bolt 8 to base 10, using the capsule of the present invention, partly shown in cross-section.

By virtue of the specific construction of the capsule of the present invention, wherein a surfactant is used in addition to a combination of a curable resin composition and a curing agent disposed in isolation from the curable resin composition, and wherein each of the main components of the curable resin composition has a specific gravity equal to or greater than the specific gravity of sea water, not only does it become possible to stably fix an anchor bolt to a base located in sea water or water, or to a base located on a shore, with high strength, but also it is very unlikely that any portion of the curable resin composition will escape and float to the surface of the sea, so that the anchor bolt-fixing work can be safely done without a danger of polluting the sea, watercourses and the like.

We claim:

1. A capsule for use in fixing an anchor bolt, comprising:
   (1) a primary casing having a sealed construction, or having at least one opening which is closed by means of closure means to thereby provide a fluid-tight construction;
   (2) a curable resin composition contained in said primary casing, said curable resin composition comprising an epoxy acrylate resin composed mainly of an ester of an epoxy resin with at least one organic acid selected from the group consisting of acrylic acid and methacrylic acid, and a reactive monomer, each of said epoxy acrylate resin and said reactive monomer having a specific gravity equal to or greater than the specific gravity of sea water;
   (3) a curing agent for said curable resin composition, disposed in association with said primary casing and in isolation from said curable resin composition, said curing agent comprising an organic peroxide; and
   (4) a surfactant contained in at least one member selected from the group consisting of said curable resin composition and said curing agent, or disposed in association with said primary casing and separately from said curable resin composition and said curing agent, said primary casing being breakable by the action of an anchor bolt when the anchor bolt is driven into the capsule.

2. The capsule according to claim 1, wherein said surfactant is an anionic surfactant.

3. The capsule according to claim 2, wherein said anionic surfactant is a salt of a sulfosuccinic acid ester.

4. The capsule according to claim 3, wherein said anionic surfactant is a sodium salt of dioctyl sulfosuccinate.

5. The capsule according to any one of claims 1 to 4, wherein said reactive monomer is an acrylic acid ester or a methacrylic acid ester.

6. The capsule according to claim 1, wherein an interior of said primary casing is fluid-tightly divided into a first chamber and a second chamber by means of partition means, one of said first and second chambers containing said curing agent and the other chamber containing said curable resin composition, and wherein said partition means is breakable when the anchor bolt is driven into the capsule.

7. The capsule according to claim 6, wherein said partition means is constituted of an entire wall of a fluid-tightly constructed inner casing disposed in said primary casing, so that said first chamber is defined by a space between the inner peripheral wall of said primary casing and the outer peripheral wall of said inner casing and said second chamber is defined by an inner space of said inner casing.

8. The capsule according to claim 1, wherein said curing agent is disposed on at least a portion of an outer peripheral wall of said primary casing.

9. The capsule according to claim 1, wherein said primary casing has at least one opening which is closed by means of closure means, wherein said closure means is a clip, a cap fluid-tightly fitted over an outer peripheral wall of said opening, or a plug having an end portion thereof fluid-tightly inserted in said opening.

10. The capsule according to and 1, wherein said primary casing has at least one opening which is closed by means of closure means, wherein said closure means is a plug made of said curing agent in solidified form and having an end portion thereof fluid-tightly inserted in said opening, and wherein the inserted end portion of said plug is in contact with and cooperates with a portion of the curable resin composition contained in said primary casing, which portion faces the inserted end portion of said plug, to form a partition membrane by a reaction therebetween, said partition membrane isolating said curing agent from said curable resin composition.

11. The capsule according to claim 1, wherein said reactive monomer has a specific gravity of 1.04 or more.

12. The capsule according to claim 1, wherein said epoxy acrylate resin contains a coloring agent.

13. The capsule according to claim 1, wherein said curable resin composition has a viscosity of from 5 to 60 poises at 25° C. as measured by using E type viscometer.

14. The capsule according to claim 1, wherein said epoxy acrylate resin contains a pigment.

15. The capsule according to claim 1, wherein said epoxy acrylte resin contains an ultraviolet ray absorber.

* * * * *